United States Patent
Beaty et al.

(10) Patent No.: US 8,140,907 B2
(45) Date of Patent: Mar. 20, 2012

(54) ACCELERATED VIRTUAL ENVIRONMENTS DEPLOYMENT TROUBLESHOOTING BASED ON TWO LEVEL FILE SYSTEM SIGNATURE

(75) Inventors: Kirk A. Beaty, Goldens Bridge, NY (US); Michael R. Head, Tarrytown, NY (US); Anca Sailer, Scarsdale, NY (US); Charles O. Schulz, Ridgefield, CT (US); Hidayatullah H. Shaikh, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/826,219

(22) Filed: Jun. 29, 2010

(65) Prior Publication Data

US 2011/0320882 A1 Dec. 29, 2011

(51) Int. Cl.
G06F 11/00 (2006.01)
(52) U.S. Cl. ........................ 714/38.1; 714/37; 714/38.11
(58) Field of Classification Search .................. None
See application file for complete search history.

(56) References Cited

U.S. PATENT DOCUMENTS

| | | | |
|---|---|---|---|
| 5,928,369 A | 7/1999 | Keyser et al. | |
| 6,339,832 B1 | 1/2002 | Bowman-Amuah | |
| 7,269,824 B2 | 9/2007 | Noy et al. | |
| 7,475,387 B2 | 1/2009 | Chandane | |
| 7,712,085 B2 | 5/2010 | McCollum et al. | |
| 7,890,951 B2 * | 2/2011 | Vinberg et al. | 717/174 |
| 2002/0073063 A1 | 6/2002 | Faraj | |
| 2003/0028861 A1 | 2/2003 | Wallman et al. | |
| 2005/0028146 A1 * | 2/2005 | Quick | 717/130 |
| 2005/0154557 A1 | 7/2005 | Ebert | |
| 2005/0188357 A1 | 8/2005 | Derks et al. | |
| 2006/0129994 A1 | 6/2006 | Srivastava et al. | |
| 2006/0265707 A1 | 11/2006 | Hayes et al. | |
| 2008/0098387 A1 | 4/2008 | Lo et al. | |
| 2008/0127098 A1 | 5/2008 | Bates et al. | |
| 2008/0250405 A1 | 10/2008 | Farhangi et al. | |
| 2009/0300423 A1 * | 12/2009 | Ferris | 714/38 |
| 2011/0041124 A1 | 2/2011 | Fishman et al. | |
| 2011/0145800 A1 | 6/2011 | Rao et al. | |

OTHER PUBLICATIONS

Wang et al., Peer Pressure for Automatic Troubleshooting, Sigmetrics Performance, Jun. 12-16, 2004, New York.

(Continued)

*Primary Examiner* — Michael Maskulinski
(74) *Attorney, Agent, or Firm* — Scully, Scott, Murphy & Presser, P.C.; Louis J. Percello, Esq.

(57) ABSTRACT

Troubleshooting virtual environment deployment based on two level file system signatures, in one aspect, may include creating a first level file system signature including a set of file names of files in an image of a virtual machine taken at a point in time and associated status of the files as compared with an image of the virtual machine taken at a preceding point in time. A second level file system signature may be created using file content differences of the files having modified status in the set of file names. The first level file system signature may be compared with a first level file system signature pattern associated with one or more previous deployment of the same software and related to the same point in time. Optionally, the second level file system signature may be compared with a second level file system signature pattern.

25 Claims, 3 Drawing Sheets

OTHER PUBLICATIONS

Wheeler, Why Open Source Software / Free Software (OSS/FS, FLOSS, or FOSS)? Look at the Numbers!, available at http://www.dwheeler.com/oss_fs_why.html#tco Revised as of Apr. 12, 2007.

WebSphere Application Server V6 Problem Determination for Distributed Platforms, SG24-6798-00, Redbook, Nov. 20, 2005, http://www.redbooks.ibm.com/redbooks/pdfs/sg246798.pdf.

DB2 Warehouse Management: High Availability and Problem Determination Guide, SG24-6544-00, Redbook, Mar. 22, 2002, http://www.redbooks.ibm.com/redbooks/pdfs/sg246544.pdf.

IBM Support Assistant, IBM Corporation, 2009, ftp://public.dhe.ibm.com/software/websphere/techexchange/ISA_QuickView_2009.pdf.

Reimer et al., Opening Black Boxes: Using Semantic Information to Combat Virtual Machine Image Sprawl, to appear in Proceedings of the 2008 ACM International Conference on Virtual Execution Environments (VEE 2008).

Cohen et al., Capturing, indexing, clustering, and retrieving system history Export, In the ACM Sigops Operating Systems Review, vol. 39, Issue 5, Dec. 2005.

Wespi et al., An intrusion detection system based on the Teiresias pattern discovery algorithm, in EICAR Annual Conference Proceedings, pp. 1.15, 1999.

Stearley, Towards informatic analysis of syslogs. In Proceedings of the 2004 IEEE Conference on Cluster Computing, 2004, Abstract.

Rigoutsos et al., Combinatorial Pattern Discovery in Biological Sequences: The TEIRESIAS Algorithm, Bioinformatics, 1998, vol. 14, No. 1.

CVS, Open Source Version Control, Concurrent versions System, Copyright (C) 2--5-2006 Derek Robert Price & Ximbiot and Copyright (C) 1998 Free Software Foundation, Inc., 59 Temple Place—Suite 330, Boston, MA 02111, USA, http://www.nongnu.org/cvs/.

Chacon, S., GIT, Fast Version Control System, Jan. 20, 2010, http://git-scm.com/.

Gillen et al., The Role of Linux in Reducing the Cost of Enterprise Computing, An IDC White Paper Sponsored by Red Hat Inc., IDC, Framingham, MA, 2001.

Laadan et al., DejaView: A Personal Virtual Computer Recorder, SOSP '07, Oct. 14-17, 2007, Stevenson, Washington, USA, Copyright 2007 ACM 978-1-59593-591-5/07/0010, http://74.125.113.132/search?q=cache:_pTK3eEsghkJ:citeseerx.ist.psu.edu/viewdoc/download°/03Fdoi%3D10.1.1.67.9106%26rep%3Drep1%26type%3Dpdf+IT+DejaView&cd=2&hl=en&ct=clnk&gl=us&client=firefox-a.

U.S. Office Action dated Jan. 20, 2011 received in related U.S. Appl. No. 12/701,232.

U.S. Office Action dated Jun. 23, 2011 received in related U.S. Appl. No. 12/701,232.

Notice of Allowance mailed Nov. 16, 2011 in related U.S. Appl. No. 12/701,232.

* cited by examiner

ACCELERATED VIRTUAL ENVIRONMENTS DEPLOYMENT TROUBLESHOOTING BASED ON TWO LEVEL FILE SYSTEM SIGNATURE

FIELD

The present application generally relates to computer systems, and more particularly to incremental problem determination and resolution in cloud environments.

BACKGROUND

A multitude of studies on the Total Cost of Operation (TCO) show that almost half of TCO, which in turn is five to ten times the purchase price of the system hardware and software, is spent in resolving problems or preparing for imminent problems in the system. See, for example, David A. Wheeler, "Why Open Source Software/Free Software (OSS/FS, FLOSS, or FOSS)? Look at the Numbers!", available at http://www.dwheeler.com/oss_fs_why.html#tco, Revised as of Apr. 12, 2007; and Gillen A., Kusnetzky, McLaron S., The role of Linux in reducing cost of enterprise computing, IDC white paper, January 2002. Hence, the cost of problem determination and resolution (PDR) represents a substantial part of operational costs.

Making PDR cost effective, for example, through standardization and asset reuse has not worked in traditional information technology (IT) environments. See, for example, "WebSphere Application Server V6 Problem Determination for Distributed Platforms", SG24-6798-00, Redbook, 20 Nov. 2005; and "DB2 Warehouse Management: High Availability and Problem Determination Guide", SG24-6544-00, Redbook, 22 Mar. 2002. The IT resources being dedicated to a particular customer and their applications, leads to a diversity of configuration among IT environments and applications that make it difficult to programmatically reuse scripts, workflows, lessons learned from one environment to another.

BRIEF SUMMARY

A method for troubleshooting virtual environment deployment based on two level file system signatures, in one aspect, may include comparing an image of a virtual machine taken at a point in time with an image of the virtual machine taken at a preceding point in time during an installation of software, and creating a first level file system signature including a set of file names of files in image of a virtual machine taken at a point in time and associated status of the files as compared with the image of the virtual machine taken at a preceding point in time. The method may also include creating a second level file system signature using file content differences of the files having modified status in the set of file names. The method may further include comparing the first level file system signature with a first level file system signature pattern associate with one or more previous deployment of the same software and related to the same point in time. In another aspect, the method may also include comparing the second level file system signature with a second level file system signature pattern associated with the one or more previous deployment of the same software and related to the same point in time.

A system for troubleshooting virtual environment deployment based on two level file system signatures, in one aspect, may include a clone processing module operable to generate, using a set of virtual machine images taken at a plurality of points in time during an installation of software, first level signature based on file names only, the clone processing module further operable to generate second level signature based on content differences of the file names in the first level signature. The signatures may be used to troubleshoot installation procedure, for example, by comparing the first level file system signature with a first level file system signature pattern associated with one or more previous deployments of the same software and related to the same point in time. Similarly, and optionally, the second level file system signature may be compared with a second level file system signature pattern associated with the one or more previous deployment of the same software and related to the same point in time. In another aspect, the system may include a storage device storing a set of first level file system signature patterns and a set of second level file system signature patterns.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
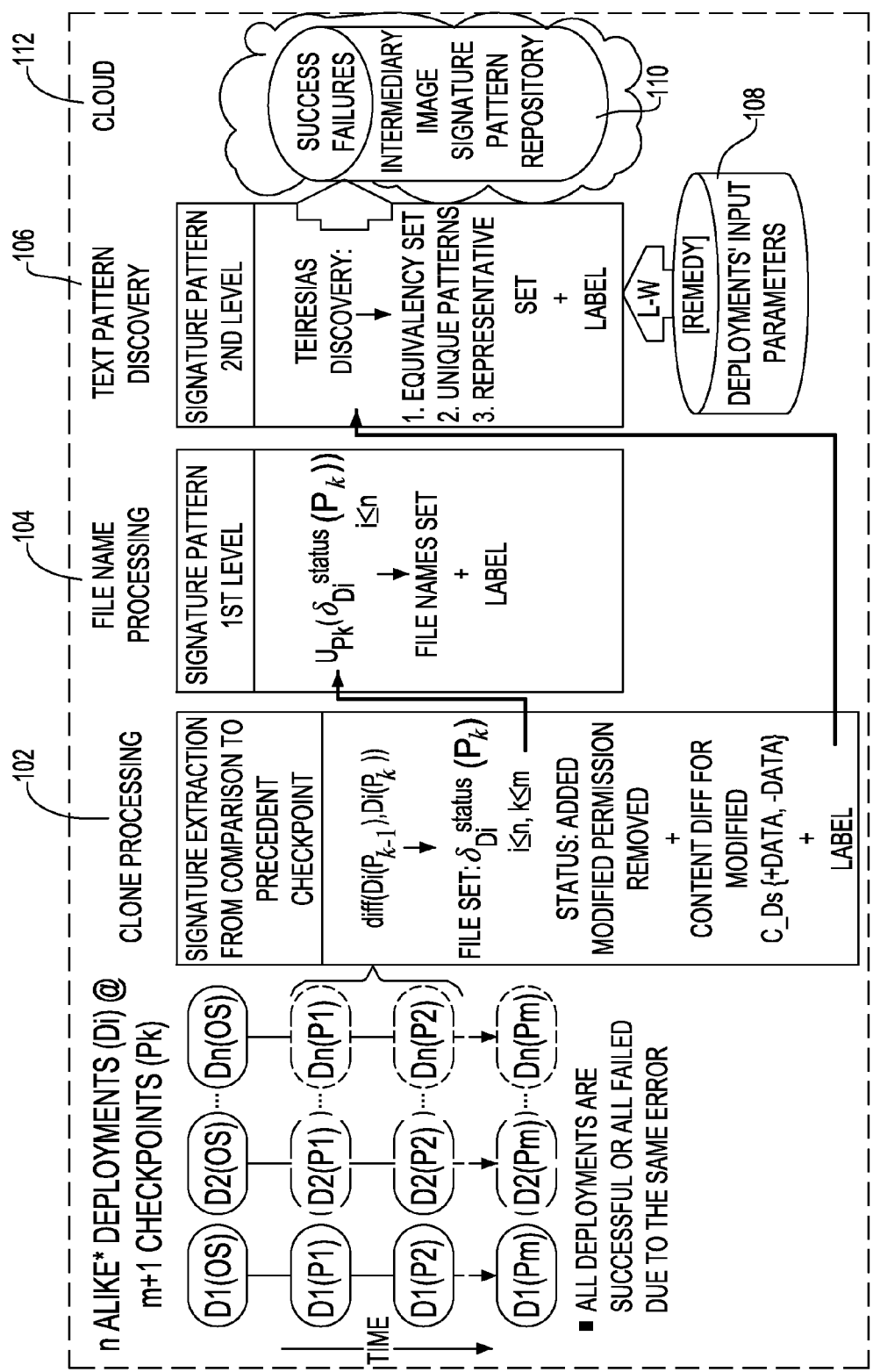
FIG. 1 illustrates the signature pattern generation process in one embodiment of the present disclosure.

An incremental problem determination and resolution (PDR) process is disclosed that, in one aspect, covers the operations for detecting anomalies during product installation in a virtual system and providing assistance to automatically recover from the cause of the problem into a stable state. Co-owned and co-pending U.S. patent application Ser. No. 12/701,232 filed on Feb. 5, 2010 discloses techniques for incremental problem determination and resolution, for instance, in cloud environments. That application is incorporated by reference in its entirety by reference.

The present disclosure provides, in one aspect, for the use of signatures for the early detection of anomalies and problem identification, for example, in deployment and running systems. The processes and algorithms of the present disclosure may include one or more of the following capabilities:

- create repository of virtual system checkpoints labeled "success" or "problem id" by the technical support personnel or the like, without stopping and restarting the virtual machine for clone generation, and in case of failure suggest repair action;
- compare the system checkpoints taken during a product installation to the correspondent checkpoints in the repository created above, for instance, at the metatdata level and/or snapshot block level, e.g., the comparison performed based on a two level signature;
- update the repository of virtual system checkpoints with new failure cases or repair actions;
- compare the system checkpoints taken during product post-installation tests to the correspondent checkpoints in the repository created above.

The above steps are described in more detail with reference to the drawings.

The novel aspects of the present disclosure may be in early detection of anomalies during the installation of complex software solutions, such as the cloud computing services infrastructure, through capture and storage of problems' distinctiveness together with label and potential remediation for future retrieval. The methodologies of the present disclosure may also provide for problem identification and assistance to automatically recover from a known problem into a stable state. In addition, a virtual image technology based generation of deployment health status signature is provided that is expandable into a second layer of details when multiple failures have similar first layer signatures. More specifically, this second layer signature is a formal representation of clones' differences. As deployments are taking place, it is assumed that failures that do not match any of the previously captured and identified (labeled) signatures are troubleshooted by the cloud service provider and labeled. A remediation reference may be attached a well. For constructing the two layers of a signature pattern the present disclosure may use different techniques: virtual image metadata may be processed for the first layer, while for the second layer, pattern recognition techniques may be used. Note that if labels are not available, clustering techniques can be used to group similar signatures. An enhanced signature generation methodology without requiring stopping and restarting the virtual machine is also provided.

The benefits involved by the usage of the aspects of the present disclosure may be realized by the decrease of the cost of the current incident and problem management methodology, through systematizing existent data, knowledge, and expertise for reusability, as well as the avoidance of the cost associated with problem determination by allowing for proactive problem resolution (fix before break) through knowledge based early notification (e.g., avoiding waiting for the end of the installation to realize it failed).

Installation package (e.g., exe, rpm, zip, script files that perform installation when executed) of software product such as operating system, middleware product, application, is annotated as described in the U.S. patent application Ser. No. 12/701,232. The annotations trigger at the install time the hypervisor or the like to take system checkpoint snapshots. Hypervisor refers to a program that enables multiple operating systems (referred to as guest operating systems) to run on a single host computer. A snapshot is the state of a computer system at a particular point in time, for example, system configuration of information of a program or machine at a particular point. A snapshot may include, for example, a copy of memory including the contents of all memory bytes, hardware registers and status indicators, files, and the like, as they exist in a computer system at a particular point in time. Checkpointing refers to taking snapshots of the current computer system or current application state. Checkpoint snapshot in the present disclosure also refers to a snapshot taken at a point in time. A checkpoint may be also considered as being a copy of the computer's memory that is saved periodically on disk or another storage device along with the current register settings. In the event of a failure, the last saved checkpoint may be restored as a recovery point.

In an information technology (IT) virtual environment the development and test teams (or the like) may install checkpoint annotated products (e.g., Operating Systems, applications) as a test. For example, a deployment script is annotated with checkpoint instructions, which trigger at explicit deployment phases specific data collection. The systematically generated checkpoint snapshots of a system are stored in an image repository. Each snapshot is labeled with "success" or "problem id" tags depending on the installation status at that point, for example, as decided by the technical personnel performing the installation. If a failure occurs, the technical personnel may attach, to the snapshot, the corresponding error description and suggested remediation. Potential remediation may include, but not limited to, restart installation, load the latest checkpoint, command scripts, etc. Command scripts for remediation may include scripts that solve the issue at hand, e.g., set "parameter x" to "value y" in "configuration".

Similarly, the customer, who is the product consumer, installs the annotated products tested above and uses data of the images repository from the same system (e.g., cloud) as the one the development and test teams used for their tests or from a different one that has a copy of or a link to the repository, for example, by copying or installing the data of the images repository to an appropriate place for use. In another aspect, a separate images repository need not be installed or copied, that is, images repository is accessible, for instance, via a network for use. The images repository has several series (following successful and unsuccessful runs) of snapshots developed during development and testing. Further, it may have snapshots from past customer deployments which may provide information on a wider array of environments than the testing team could support.

As during the tests, the checkpoint annotated products installed by the customer trigger checkpoint snapshots to be taken. There are many mechanisms available to collect required data at a checkpoint or point in time to create checkpoint snapshots, each with its own set of tradeoffs. For instance, one or more of the following may be used to collect data for snapshots: revision control software, backup systems, versioning filesystems, hypervisor-directed snapshots, and hypervisor-directed cloning.

In selecting the snapshot tools to use, the following aspects may be taken into consideration: disk usage overhead, run time performance, and the degree of change required to support it on the guest operating system. Disk usage overhead reflects the amount of additional space required to support the mechanism. The run time performance is relevant insofar as it affects the deployment time. A snapshotting mechanism that requires major changes to the guest operating system may not be as widely applicable as one that does not.

Revision control systems (RCS) such as Git, Concurrent Versions System (CVS), Subversion, can provide snapshots at a point in time, of a tree of files along with direct comparisons between arbitrary snapshots. Distributed RCS, such as Git, Bazaar, or Mercurial support a serverless mode, where all versions are recorded locally. These tools, however, are designed to work primarily with trees of programming source code which are both relatively small and text-based (which can be compressed to further reduce the size and comparison time), compared to executables and binary data files of a complete filesystem. Restricting the set of files that the revision control system would need to manage (in conjunction with a complete list of the metadata of all files on the system) would be one possible approach to using such distributed RCSs for taken a system snapshot. This approach has the advantage of decreasing the disk usage of the process.

Versioning filesystems, such as CopyFS, NILFS, and BTRFS, and some automated snapshotting filesystems such as Time Machine from Apple™ or Shadow Copy from Microsoft™ provide previous versions of files (or the entire filesystem) at points in time in the past. They are often implemented efficiently with copy-on-write schemes so only the block-level differences are stored over time. Unless the filesystem directly supports full tree comparisons, it may be difficult to capture the differences between snapshots, but it is nevertheless possible. When such a filesystem is implemented efficiently, the run time overhead is small, because snapshots can be taken immediately. The disk usage overhead is only as big as the changes (including deletions) made to files between each snapshot. Using such versioning filesystems may impact the guest OS. That is, while some operating systems have snapshotting facilities built into the filesystem (e.g., Apple™ OS X, Microsoft™ Windows™ Server), many do not or may not have it enabled by default, and therefore, need to be installed for use.

Hypervisor-level snapshotting is another option. In this case, a copy-on-write file is created from the disk image when the snapshot is taken. All future writes by the virtual machine (VM) to its disk are captured there, leaving the previous disk image untouched. The file usage overhead is low, and there is little impact on the guest OS because it is run completely outside of the operating system. In order to reliably capture the state of the filesystem, the VM may need to be shut down. There are approaches which can capture the disk live (while the VM is running), but the filesystem could be unclean and potentially inconsistent.

Hypervisors can also create a clone of a virtual machine, which contains an exact copy of all the data on the virtual machine. It may take between several minutes and several hours depending on image size and I/O performance. To reliably make a clone with a clean filesystem, the VM may need to be shut down.

Mirage™ from IBM Corporation provides a set of APIs that enable sophisticated operations to be performed directly on dormant images within an image repository, without having to first retrieve the image or instantiate and run it. It builds on semantic information about the disk image. Mirage™ searchability enables disk comparisons at file-level granularity. However, VM needs to be stopped for clone capture, and there may be some delay attributed to copying the clone.

The present disclosure uses a technique to obtain a storage consistent snapshot of a VM. Using the snapshot of a running VM obtained in the present disclosure, for example, the memory state of a system may be discarded, and the VM may still be restarted without resorting to file system recover and without losing any data which has been written to the file system. Such a snapshot can be used in two fashions. It can be used to resume the VM at the exact operational state when the snapshot was taken. In this case, the captured memory state is used along with the storage state. The second use of this snapshot can be to reboot the VM from the storage state alone and have the VM be in the equivalent operational state after the boot is completed.

A typical running VM snapshot proceeds as follows: (1) Copy all static state of the memory to the memory image keeping track of any memory blocks which are changed after they are copied to the image; (2) Quiese the VM (i.e., stop all virtual CPU activity); (3) Copy any memory blocks which have changed since being written to the memory image; (4) Snapshot the storage state; (5) Resume the VM. Traditionally, steps (3) and (4) are kept to a minimum, and more specifically, the number of blocks copied in step (3) are minimized so that running snapshots cause as little interruption of on-going activities as possible.

In the present disclosure, this minimizing of the number of blocks to copy in step (3) is to some extent relaxed, in order to quickly capture the storage state of the VM at a time when the VM is idle (i.e., between installation steps). To accomplish this, the methodology of the present disclosure in one embodiment combines certain parts of a typical shutdown process with the running snapshot process. This new procedure is as follows: (1) Complete all the operations prior to the state of interest for the snapshot (i.e., get all install processes, which need to be done before the snapshot evaluation completed from a process standpoint) and suspend the install process; (2) Cause the buffer cache to be flushed to storage (e.g., 'sync' (synchronize) the disks in UNIX like operating systems); (3) Take a snapshot of the running VM (the process above); (4) Resume the install process. This process avoids the majority of the time consuming shutdown and startup of the VM replacing it with the relatively quick 'sync' of the disks. A possible embodiment of snapshot-ing without starting the machine is described in U.S. Patent Publication No. 2010/0011178, Systems and Methods For Performing Backup Operations Of Virtual Machine Files.

Besides the deployment package annotation for image capturing, if functionality tests are available as part of the package, a similar approach can be applied for validating these tests. That is, the test codes or programs that validate the installed software or application may be annotated similarly, for instance, by adding additional code that tells the test code to stop and wait for a snapshot to be taken at one or more points in the test. When annotating the functionality test scripts, intermediary or final test states can be captured as well for automatic signature analysis against signature patterns.

A signature is a formal characterization of an entity's distinctive features. The signature in the present disclosure may characterize formally the health state of deployment at intermediary points. The methodology of the present disclosure may identify the state reached by a given deployment before proceeding to the next step, by comparing the current state to the same intermediary state of previous deployments of the same application. The signature chosen to characterize the state provides the proper information to allow such comparing for identifying the state.

A signature is a set of unique features generated by the methodology of the present disclosure. In one embodiment, the filesystem representation may be used as a signature of the deployment states. Filesystem representation may include the state of the filesystem, for example, system files and their attribute information. For instance, a filesystem representation may be a list of all directories and files with their size, creation time, modification time, owner, type, and other attributes, or it can be a subset of those. To reduce the size of the memory in the repository, rather than keeping the signature at this level of detail, the filesystem differences with the previous deployment state may be used as the signature in another embodiment. Yet in another embodiment, additional information can be added to this basic signature such as resource utilization metrics, performance metrics, external characteristics (e.g., temperature). A system state may be characterized using all or some of those metrics or other additional information.

Using a known tool for example, a filesystem image can be captured, as well as the filesystem differences between two images. The signature as described above in one embodiment and explained further below is the result of the comparison between two successive intermediary deployment filesystem images together with the label identifying the state (e.g., success or a specific failure). To further save on the use of memory and comparison response time, the following proposed process may be utilized, in lieu of storing and comparing against all various signatures of previous deployments. For example, the methodology of the present disclosure in one embodiment may process the signatures that are related or have the same labels in order to generate a single signature pattern per state and per label. A labeled signature is a signature that is labeled, for example, as "success" or "problem id". Problem id (identifier) identifies a specific failure.

FIG. 1 illustrates the signature pattern generation process in one embodiment of the present disclosure. $D_i$ represents i-th deployment of alike products, where i=1 to n, and n is the number of deployments. $P_k$ represents a snapshot taken at k-th point in time (k-th checkpoint), where i=1 to m, and m is the number of points in time. For example, in FIG. 1, D1(OS) represents one deployment (e.g., referred herein as a "first" deployment for simplicity of explanation) of an operating system, and D1(P1), D1(P2), D1(Pm) represent respectively, snapshots of the system during this deployment taken at point in time P1, point in time P2, . . . point in time Pm. D2(OS) represents another deployment (e.g., referred herein as a "second" deployment) of the operating system, and D2(P1), D2(P2), D2(Pm) represent respectively, snapshots of the system during this second deployment taken at point in time P1, point in time P2, . . . point in time Pm. Similarly, Dn(OS) represents yet another deployment (e.g., referred herein as an "n-th" deployment) of the operating system and Dn(P1), Dn(P2), Dn(Pm) represent respectively, snapshots of the system during this n-th deployment taken at point in time P1, point in time P2, . . . point in time Pm.

The component labeled "Clone Processing" 102 in FIG. 1 shows extracting signature by comparing a snapshot or an image of a virtual system to the one from the preceding checkpoint. In this signature extraction, the filesystem image is compared to the previous filesystem image in a deployment. In one embodiment, the signature extracted or created from the comparison between successive filesystem images at $D_i(P_{k-1})$ and at $D_i(P_k)$ under Clone Processing is expressed as (1) a set of file names $\delta_{Di}^{status}(P_k)$ with annotated status "Added", "Modified", "Permission", or "Removed" and (2) sets of file content differences for the file names annotated "Modified". $\delta_{Di}^{status}(P_k)$ represents a set of file names with annotated status at a point in time $P_k$ for deployment $D_i$. Thus, $\delta_{Di}^{status}(P_k)$ sets may include $\delta_{Di}^{modified}(P_k)$ listing names of files that have been modified, $\delta_{Di}^{addd}(P_k)$ listing names of files that have been added, $\delta_{Di}^{Permission}(P_k)$ listing names of files that have permission changes, $\delta_{Di}^{removed}(P_k)$ listing names of files that have been removed. In one embodiment, these two types of sets may be treated differently and two levels of signature patterns may be generated: (1) a high level pattern based on file names only and (2) a detailed pattern based on files' content. Depending on the tool used for filesystem image comparison, "Copied" and "Renamed" annotations may be present as well. Note that when they are not, the respective "Copied" or "Renamed" files may appear under "Added" and "Removed" instead.

The component labeled "File Name Processing" 104 in FIG. 1 shows creating the first level of signature patterns, i.e., signature pattern based on file names only, in one embodiment of the present disclosure. This signature pattern includes the above sets of names of files and a label showing whether the installation at this checkpoint is success or specific failure. This level of signature patterns may be generated through union of the file name sets across all deployments (all $D_i$'s, where i=1 to n) for signatures having the related signatures at each $P_k$ where k=1 to m. That is, all signatures labeled identically are grouped. For example, all signatures of labeled as ""success" (successful installs) are grouped together, all signatures labeled with "problem id X" are grouped together and so forth.

This union set may be used for signature retrieval. For example, for correct deployments the file names are usually the same from one deployment to another, but in case of failures, they may not. The first level signature pattern may be common for the same deployment phase among different failures. For example, if a machine crashes from lack of memory with a blue screen showing on a computer display or it crashes from ventilation failure with a blue screen, although they are different failures, the signature "blue screen" is the same.

The component labeled "Text Pattern Discovery" 106 shows creating the second level of signature patterns, i.e., differences in file content between successive checkpoints. To generate a second level of signature pattern, the modified files' content differences may be analyzed. For example, text-based files that use printable ASCII characters such as .txt files in Windows™, hypertext markup language (HTML) documents, Latex™ documents, and others, may be tracked and analyzed, for example using tools that compare files. Those text files may be logs and configuration files which are expected to change during a deployment. If a binary file was modified, this information is captured at the file name level by the first level signature. The "byte-level" file comparison itself may be performed optionally.

$\delta_{Di}^{modified}(P_k)$ represents a list of files in deployment $D_i$ that were modified between the point in time $P_{k-1}$ and $P_k$. Using the sets of modified text file names, $\delta_{Di}^{modified}(P_k)$ under Clone Processing, for each file name in the modified text file names, the content differences to the corresponding file in the precedent deployment step are extracted. The content differences are stored into a content differences (C_D) file. The differences in the content may be extracted using algorithms such as "diff" operations or git or others to get differences in the content of the files. The C_D files may be processed to have one difference per line.

The second level of signature pattern is obtained from these C_D files of signatures having the same or related labels across all deployments (all $D_i$'s, where i=1 to n) at each $P_k$ where k=1 to m. The second level signatures are generated by examining across multiple deployments, generating multiple set of file name differences and file content differences. By examining the multiple set of file name differences and file content differences, patterns (signature patterns) from deployment that experienced the same result may be extracted and, success or failure of installation at a particular phase of deployment may be inferred. In one embodiment, the second level signature contains words or content that are unique in files that differ from the "normal" install (i.e., installs that are labeled success); The second level signature pattern contains words that are unique in files that differ from the normal install and appear repeatedly from one deployment to another.

There are a number of algorithms that can be used to determine patterns. Text pattern discovery methodologies that find the maximal variable-length patterns by avoiding the generation of maximal intermediate patterns would be useful. For example, Rigoutsos, I. and A. Floratos, "Combinatorial Pattern Discovery In Biological Sequences: The TEIRESIAS Algorithm", Bioinformatics, Vol. 14, num. 1, 1998 (herein referred to as "Teiresias") is such a pattern discovery algorithm developed for bioinformatics at IBM and has been applied outside its domain, including for security anomaly detection and log analysis. It discovers all patterns in string data of at least a user-given specificity and support. More explicitly, given a set of strings X composed of characters C, Teiresias finds all patterns M (composed of characters C and wildcard "*") having at least a specificity of L/W (where L is the minimum number of fixed characters from C, and W is the total width of the pattern including wildcards), which occur at least K (called support) times in X. It first hashes all patterns of length W appearing in the data, then prunes those not meeting the minimum support criteria K, and then conducts a "convolution" phase where all remaining patterns are attached together to generate the longest patterns existing in the data. The algorithm takes in worst-case exponential time, but most datasets yield results in polynomial time, making it applicable to the methodology of the present disclosure for file differences comparison analysis.

The technique of Teiresias may be applied using as input text fragments, that is, all the C_D files related to a file name across all deployments with the related or same labeled signatures. As described above, the first level signature includes the list of names of the files that have been detected to be different from one checkpoint to the next checkpoint. The second level signature extracts the differences in content of those files. Teiresias algorithm (or another algorithm) may process the differences in the content of those files to further generate the second level signature. For example, in this case each paragraph that ends with a carriage return, which is one file difference, is a single event stream that is processed into a string. First, Teiresias removes punctuation marks, then it collects the vocabulary that the input defines, maps each word of the vocabulary to an integer, then re-maps the input text to an input of integer streams. The output is a list of patterns with a 'dot' representing a wild-card, together with the rank of the pattern, the number of instances of the pattern and the number of input paragraphs that contain these instances. The methodology of the present disclosure may repeat the Teiresias discovery modified for all the file names in the $\delta_{Di}^{modified}(P_k)$ sets. The union of the C_D based generated patterns for a labeled signature represents the Equivalency Set of that signature. For example, a C_D file containing "AA BB" may be compared with another C_D file containing "AA CC". The Equivalency Set includes the content that is common in both files, i.e., "AA". To generate the Unique Patterns, the patterns in the Equivalency Set are removed from the C_D files. In the above example, "AA" is removed and a C_D file is left with "BB" and the other C_D file is left with "CC". The union of those files is "BB CC". Thus, after removing from each C_D file the discovered patterns and obtaining the union of the result for a labeled signature (signature of same or related label), the Unique Patterns for that signature is obtained. In the above example, the Unique Patterns includes "BB CC".

The union of the Unique Patterns across the files in $\delta_{Di}^{modified}(P_k)$ for all $D_i$ where i=1 to n, forms the Representative Set of patterns and the second level signature in one embodiment.

If the deployment input parameters have been stored at 108, those are removed from the Unique Patterns list. That is, if the differences are related to configuration parameters, they are not really differences in the deployment flow, rather they are expected differences, so they are considered to be irrelevant to signatures. The first and second level signature together with the signature related label, are stored in the intermediary image signature pattern repository 110, illustrated in FIG. 1. For each new deployment these patterns are updated following the above process. These signature patterns are used for signature retrieval.

By comparing the signature of a current deployment state against the ones in the signature pattern repository 110, the similar signature(s) may be retrieved and thus the current state inferred. The similarity technique described in I. H. Witten and E. Frank, "Data Mining: Practical Machine Learning Tools and Techniques with Java Implementations", Academic Press, 2000 may be used.

In one embodiment, an ordered list of potential signatures may be generated first by calculating the similarity of the $\delta_{Di}^{status}(P_k)$ to the first level signatures. The file names from the current deployment may be compared to those of the first level signature. If the similarity measure has high close values for two or more first level signatures, the methodology of the present disclosure may proceed to the similarity measure of the C_D files against the Representative Set of the second level signatures.

The intermediary image signature pattern repository may be part of a cloud 112 shown in FIG. 1. A cloud represents infrastructure that can efficiently provide IT services by taking advantage of virtualization and distributed computing. The cloud environment may be private computing cloud that is contained within the enterprise, but not limited to only a private cloud. The cloud environment may include enterprise level applications that provide the infrastructure enabling cloud computing services built by, for example, integrating multiple interrelated software component. The method and system described herein may be utilized when deploying a cloud computing management infrastructure.

The cloud environment may include components of a computer system that may include any computing node that is able to load and execute programmatic code, for instance, running the operating system and server application suite. The system logic may be embodied as computer executable code that is loaded from a remote source (e.g., from a network file system), local permanent optical (CD-ROM), magnetic storage (such as disk), or storage into memory for execution by a central processing unit, a processor and/or cores. A network interface may be used for communicating to other network accessible services. Such an interface may include, but is not limited to a hardwired device, e.g., Ethernet over coax cable, wireless IP, and telephone to IP (VoIP), or others. The memory may include computer readable instructions, data structures, program modules and application interfaces providing logic or functional components.

It should be understood, however, that the system and method of the present disclosure is not limited to only that configuration. Thus, the components may be distributed over a network on different platforms in a distributed environment, and/or configured in a cloud computing environment. The system may include multiple processors and/or cores.

Figure 2:
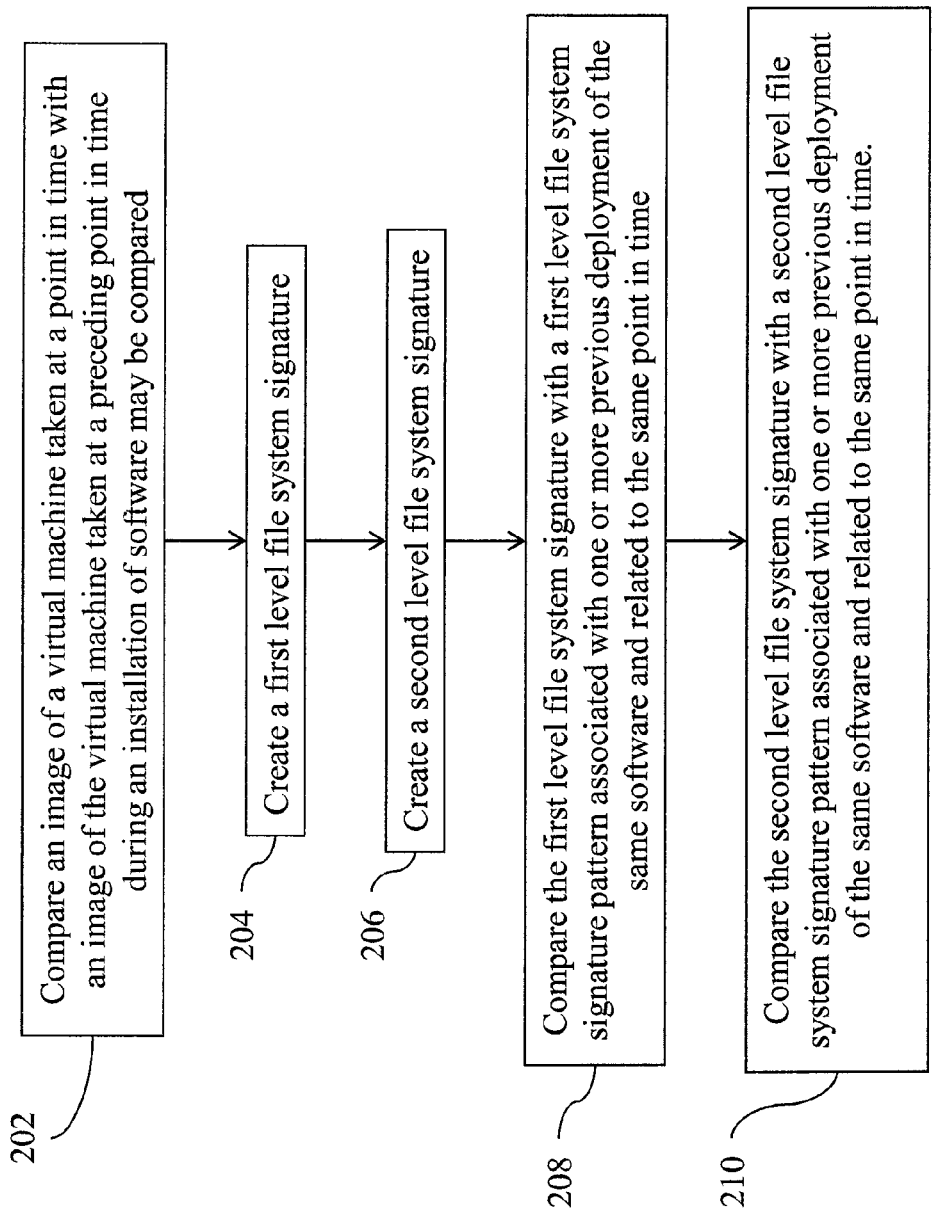
FIG. 2 is a flow diagram illustrating a logic flow for trouble shooting software deployment based on two level file system signatures, in one embodiment of the present disclosure.

FIG. 2 is a flow diagram illustrating a logic flow for trouble shooting software deployment based on two level file system signatures, in one embodiment of the present disclosure. At 202, an image of a virtual machine taken at a point in time with an image of the virtual machine taken at a preceding point in time during an installation of software may be compared.

At 204, a first level file system signature may be created. The first level file system signature may include a set of file names of files in an image of a virtual machine taken at a point in time and associated status of the files as compared with the image of the virtual machine taken at a preceding point in time. For example, this set may be the names of files in the current image of a virtual machine that have differences from the preceding point in time image of the virtual machine. This set may be expressed as a set of file names $\delta_{Di}^{status}(P_k)$ with annotated status "Added", "Modified", "Permission", or "Removed" and (2) sets of file content differences for the file names annotated "Modified". $\delta_{Di}^{status}(P_k)$ represents a set of file names with annotated status at a point in time $P_k$ for deployment $D_i$. Thus, $\delta_{Di}^{status}(P_k)$ sets may include $\delta_{Di}^{modified}(P_k)$ listing names of files that have been modified, $\delta_{Di}^{addd}(P_k)$ listing names of files that have been added, $\delta_{Di}^{Permission}(P_k)$ listing names of files that have permission changes, $\delta_{Di}^{removed}(P_k)$ listing names of files that have been removed. In addition, the first level file system signature is associated with a label indicating the installation at the point in time as success or with a failure identification.

At 206, a second level file system signature may be created using file content differences of the files having modified status in the set of file names. File content differences may be created, for example, using "diff" operations or the like functions that find the differences in contents of files.

At 208, the first level file system signature may be compared with a first level file system signature pattern associated with one or more previous deployment of the same software and related to the same point in time. The first level file system signature pattern is created as a union set of first level file system signatures from all previous deployments of the same software related to the same point in time and having similar labels.

Optionally at 210, the second level file system signature may be compared with a second level file system signature pattern associated with one or more previous deployment of the same software and related to the same point in time. The second level file system signature pattern is associated with a label indicating the installation at the point in time as success or with a failure identification. The second level file system signature pattern is created as a union set of second level file system signatures from all previous deployments of the same software related to the same point in time and having similar labels.

The first level file system signature pattern is then updated to include the first level file system signature. Similarly, the second level file system signature pattern is updated with the second level file system signature.

Using the above methodology wherein the steps in FIG. 2 are performed for each phase of the installation using the point in time images (snapshots) of each phase, software installation can be troubleshooted incrementally at each phase.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Parts of the program code may execute on the source and target servers of the migration.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

Figure 3:
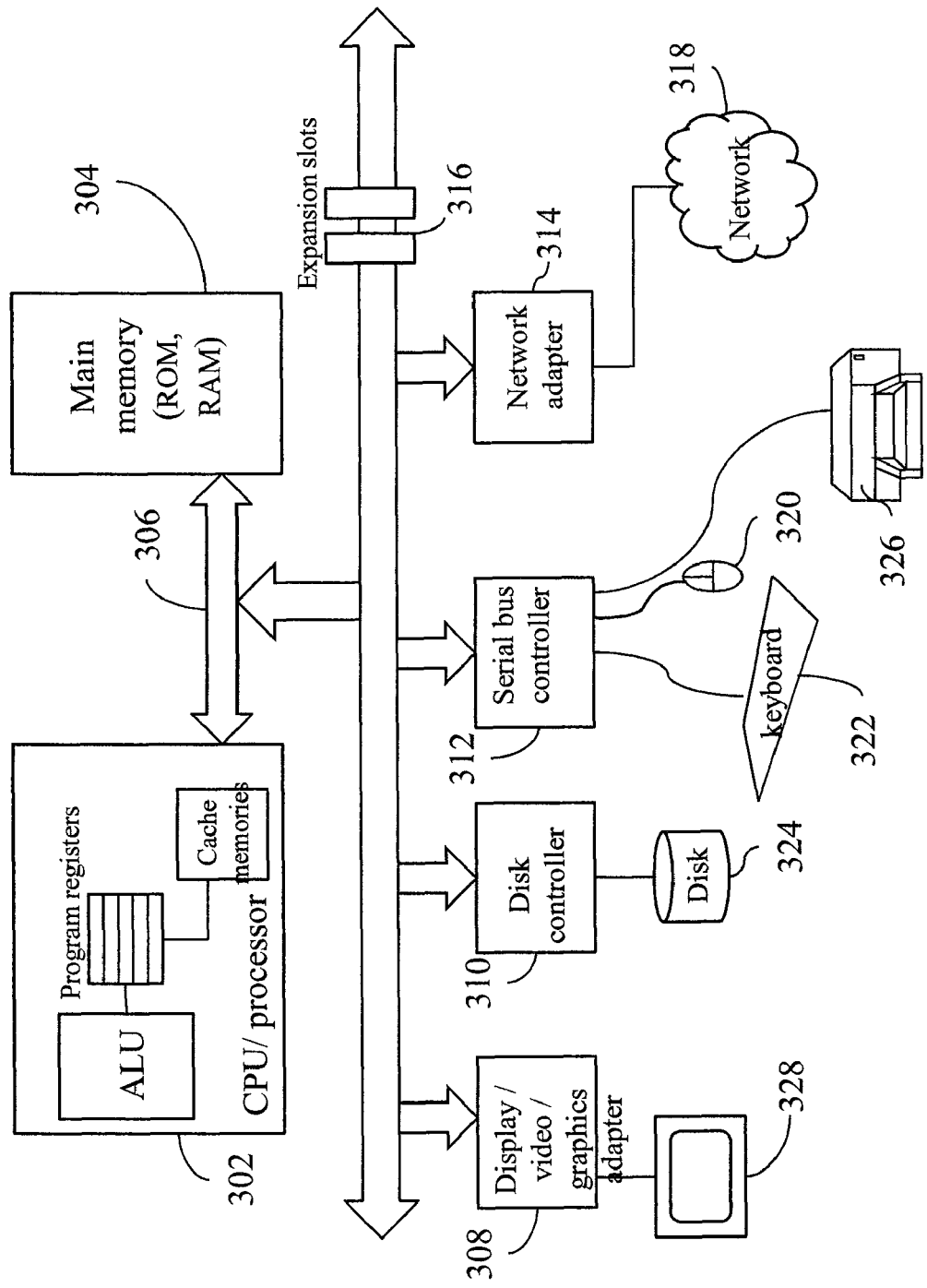
FIG. 3 illustrates an example of a computer system, in which the systems and methodologies of the present disclosure may be carried out or executed.

FIG. 3 illustrates an example computer system that may implement the system and/or method of the present disclosure. One or more central processing units (CPUs) 302 may include arithmetic/logic unit (ALU), fast cache memory and registers and/or register file. Registers are small storage devices; register file may be a set of multiple registers. Caches are fast storage memory devices, for example, comprising static random access (SRAM) chips. Caches serve as temporary staging area to hold data that the CPU 302 uses. Shown is a simplified hardware configuration. CPU 302 may include other combination circuits and storage devices. One or more central processing units (CPUs) 302 execute instructions stored in memory 304, for example, transferred to registers in the CPU 302. Buses 306, for example, are electrical wires that carry bits of data between the components. Memory 304 may include an array of dynamic random access memory (DRAM) chips, and store program and data that CPU 302 uses in execution. The system components may also include input/output (I/O) controllers and adapters connected to the CPU 302 and memory 304 via a bus, e.g., I/O bus and connect to I/O devices. For example, display/graphic adapter connects 8 a monitor 328 or another display device/terminal; disk controller 310 connects hard disks 324, for example, for permanent storage; serial controller 312 such as universal serial bus (USB) controller may connect input devices such as keyboard 322 and mouse 320, output devices such as printers 326; network adapter 314 connects the system to another network, for example, to other machines. The system may also include expansion slots to accommodate other devices to connect to the system. For example, a hard disk 324 may store the program of instructions and data that implement the above described methods and systems, which may be loaded into the memory 304, then into the CPU's storage (e.g., caches and registers) for execution by the CPU (e.g., ALU and/or other combinational circuit or logic). In another aspect, all or some of the program of instructions and data implementing the above described methods and systems may be accessed, and or executed over the network 318 at another computer system or device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for troubleshooting virtual environment deployment based on two level file system signatures, comprising:
    comparing, by a processor, an image of a virtual machine taken at a point in time with an image of the virtual machine taken at a preceding point in time during an installation of software;
    creating a first level file system signature including a set of file names of files in image of a virtual machine taken at a point in time and associated status of the files as compared with the image of the virtual machine taken at a preceding point in time;
    creating a second level file system signature using file content differences of the files having modified status in the set of file names;
    comparing the first level file system signature with a first level file system signature pattern associated with one or more previous deployment of the same software and related to the same point in time; and
    comparing the second level file system signature with a second level file system signature pattern associated with the one or more previous deployment of the same software and related to the same point in time.

2. The method of claim 1, wherein the first level file system signature is associated with a label indicating the installation at the point in time as success or with a failure identification.

3. The method of claim 2, wherein the first level file system signature pattern is created as a union set of first level file system signatures from all previous deployments of the same software related to the same point in time and having similar labels.

4. The method of claim 1, wherein the second level file system signature pattern is associated with a label indicating the installation at the point in time as success or with a failure identification.

5. The method of claim 4, wherein the second level file system signature pattern is created as a union set of second level file system signatures from all previous deployments of the same software related to the same point in time and having similar labels.

6. The method of claim 1, further including:
    updating the first level file system signature pattern to include the first level file system signature.

7. The method of claim 1, further including:
    updating the second level file system signature pattern to include the second level file system signature.

8. The method of claim 1, wherein the steps are performed for a plurality of points in time representing a plurality of phases of the installation, wherein the installation can be troubleshooted incrementally at each phase.

9. A system for troubleshooting virtual environment deployment based on two level file system signatures, comprising:
    a processor;
    a clone processing module, executing on the processor, operable to generate, using a set of virtual machine images taken at a plurality of points in time during an installation of software, first level signature based on file names only, the clone processing module further operable to generate second level signature based on content differences of the file names in the first level signature, wherein the signatures are used to troubleshoot installation procedure by comparing the first level file system signature with a first level file system signature pattern associated with one or more previous deployments of the same software and related to the same point in time, and by comparing the second level file system signature with a second level file system signature pattern associated with the one or more previous deployments of the same software and related to the same point in time.

10. The system of claim 9, further including:
    a storage device storing a set of first level file system signature patterns and a set of second level file system signature patterns.

11. The system of claim 9, wherein the first level file system signature is associated with a label indicating the installation at the point in time as success or with a failure identification.

12. The system of claim 11, wherein the first level file system signature pattern is created as a union set of first level file system signatures from all previous deployments of the same software related to the same point in time and having similar labels.

13. The system of claim 9, wherein the second level file system signature pattern is associated with a label indicating the installation at the point in time as success or with a failure identification.

14. The system of claim 13, wherein the second level file system signature pattern is created as a union set of second level file system signatures from all previous deployments of the same software related to the same point in time and having similar labels.

15. The system of claim 9, wherein the first level file system signature pattern is updated to include the first level file system signature.

16. The system of claim 9, wherein the second level file system signature pattern is updated to include the second level file system signature.

17. A non-transitory computer readable storage medium storing a program of instructions executable by a machine to perform a method of troubleshooting virtual environment deployment based on two level file system signatures, comprising:
  comparing, by a processor, an image of a virtual machine taken at a point in time with an image of the virtual machine taken at a preceding point in time during an installation of software;
  creating a first level file system signature including a set of file names of files in image of a virtual machine taken at a point in time and associated status of the files as compared with the image of the virtual machine taken at a preceding point in time;
  creating a second level file system signature using file content differences of the files having modified status in the set of file names;
  comparing the first level file system signature with a first level file system signature pattern associated with one or more previous deployment of the same software and related to the same point in time; and
  comparing the second level file system signature with a second level file system signature pattern associated with the one or more previous deployment of the same software and related to the same point in time.

18. The storage medium of claim 17, wherein the first level file system signature is associated with a label indicating the installation at the point in time as success or with a failure identification.

19. The storage medium of claim 18, wherein the first level file system signature pattern is created as a union set of first level file system signatures from all previous deployments of the same software related to the same point in time and having similar labels.

20. The storage medium of claim 17, wherein the second level file system signature pattern is associated with a label indicating the installation at the point in time as success or with a failure identification.

21. The storage medium of claim 20, wherein the second level file system signature pattern is created as a union set of second level file system signatures from all previous deployments of the same software related to the same point in time and having similar labels.

22. The storage medium of claim 17, further including:
  adding the first level file system signature to the first level file system signature pattern.

23. The storage medium of claim 17, further including:
  adding the second level file system signature to the second level file system signature pattern.

24. The storage medium of claim 17, wherein the steps are performed for a plurality of points in time representing a plurality of phases of the installation, wherein the installation can be troubleshooted incrementally at each phase.

25. A method for troubleshooting virtual environment deployment based on two level file system signatures, comprising:
  comparing, by a processor, an image of a virtual machine taken at a point in time with an image of the virtual machine taken at a preceding point in time during an installation of software;
  creating a first level file system signature including a set of file names of files in image of a virtual machine taken at a point in time and associated status of the files as compared with the image of the virtual machine taken at a preceding point in time;
  creating a second level file system signature using file content differences of the files having modified status in the set of file names; and
  comparing the first level file system signature with a first level file system signature pattern associated with one or more previous deployment of the same software and related to the same point in time.

* * * * *